United States Patent Office 3,532,717
Patented Oct. 6, 1970

---

3,532,717
BIS(3-METHYLPHTHALIDYL) PEROXIDE AND PREPARATION
Edwin J. Strojny, Midland, Mich., assignor to The Dow Chemical Company, Midland, Mich., a corporation of Delaware
No Drawing. Filed Feb. 23, 1968, Ser. No. 707,418
Int. Cl. C07d 5/46
U.S. Cl. 260—343.3                          2 Claims

ABSTRACT OF THE DISCLOSURE

A new compound has been discovered, bis(3-methylphthalidyl) peroxide. It is effective as a pesticide for the control of houseflies, pig ascarids, daphnia and citrus green mold. It is prepared by oxidizing o-acetobenzoic acid (3-hydroxy-3-methylphthalide) with peroxytrifluoroacetic acid.

SUMMARY OF THE INVENTION

The present invention provides a novel process for making the new compound, bis(3-methylphthalidyl) peroxide, corresponding to the following formula

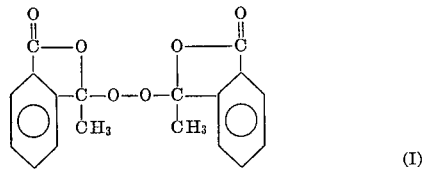

(I)

In the process, 3-hydroxy-3-methylphthalide is oxidized with peroxytrifluoroacetic acid at room temperature in the presence of a solvent proportion of a dry chlorinated solvent, according to the following equation:

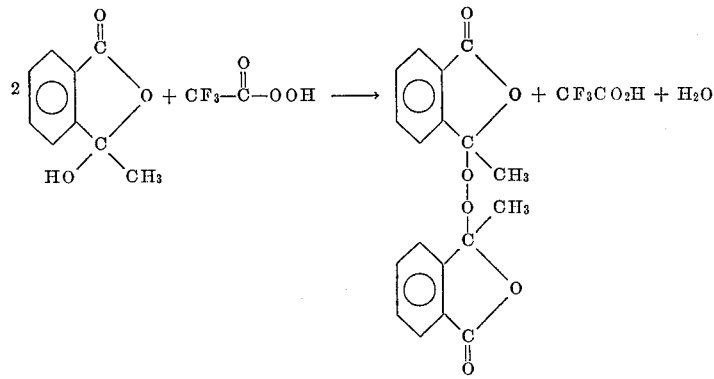

The new compound is effective as a pesticide for the control of houseflies, pig ascarids, daphnia and citrus green mold.

DETAILED DESCRIPTION OF THE INVENTION

According to the present invention, 3-hydroxy-3-methylphthalide is oxidized with peroxytrifluoroacetic acid in the presence of a solvent proportion of dry chloroform, methyl chloroform, or methylene chloride wherein the reactants and the product are dissolved. The reaction proceeds at room temperature to substantial completion, as determined by nuclear magnetic resonance (NMR). The homogeneous reaction solution is then evaporated to dryness and solid product bis(3-methylphthalidyl) peroxide is recrystallized from acetone. The crystals of bis(3-methylphthalidyl) peroxide exist in two polymorphic forms, one form having a melting point of 151–152° C. while the other form melts at 175–181° C. with decomposition. Both forms, when dissolved in chloroform and examined by infrared spectrophotometry, have the same spectrum, evidence that polymorphism is present. The infrared, mass, and NMR spectra support the bis(3-methylphthalidyl) peroxide structure. Advantageously, substantially two molar proportions of o-acetobenzoic acid are reacted with one molar proportion of peroxytrifluoroacetic acid, since these are the proportions in which the reactants react. Such proportions are not essential, however since some product forms no matter what proportions of reactants are used.

The following example describes completely a representative specific embodiment and the best mode contemplated by the inventor of carrying out the invention.

Example.—Reaction of o-acetobenzoic acid with peroxytrifluoroacetic acid

Peroxytrifluoroacetic acid is prepared by the slow addition of 0.100 mole (2.74 milliliters) of 90 percent $H_2O_2$ (titrated as 0.0365 mole $H_2O_2$/ml.) to 26.1 grams (0.125 mole) of trifluoroacetic anhydride cooled to −5 to 0° C. (after addition of the first few drops of $H_2O_2$, further addition is withheld until reaction commences, this reduction period sometimes is several minutes long). The reaction is kept cool with an ice bath. The excess of anhydride over the peroxide reacts with the water present to form trifluoroacetic acid and the resulting solution is anhydrous.

This solution is added to a solution of 26.1 grams (0.16 mole) of o-acetobenzoic acid (3-hydroxy-3-methylphthalide) in 350 milliliters of dry chloroform. A homogeneous solution results. This homogeneous solution is allowed to stand until reaction is substantially complete, as determined by NMR, and then is evaporated to dryness. The solids are recrystallized from acetone. The produce crystals exist in two polymorphic forms, one form having a melting point of 151–152° C. while the second form melts at 175–181° C. with decomposition. Both forms, when dissolved in chloroform and examined by infrared spectrophotometry, have the same spectrum, evidence that polymorphism is present. The infrared, mass and NMR spectra support the bis(3-methylphthalidyl) peroxide structure. The carbon-hydrogen analyses agree with the proposed structure:

Calculated for $C_{18}H_{14}O_6$ (percent): C, 66.2; H, 4.32.
Found (percent): C, 65.98, 66.04; H, 4.24, 4.25.

When bis(3-methylphthalidyl) peroxide is dispersed in water to the extent of 500 parts per million by weight, and adult houseflies are immersed therein and thereafter removed, 100 percent kills are obtained. In the housefly test, adult house flies are inactivated with carbon dioxide, immersed in aqueous toxicant, removed, then fed with sugar water and left in test containers for up to 3 days when mortality counts are made.

Twenty-four hour exposure of daphnia in water containing 2 parts per million by weight of bis(3-methylphthalidyl) peroxide dispersed therein gives 100 percent kills.

Nutrient agar is seeded over the surface with citrus green mold. Droplets of aqueous dispersed bis(3-methylphthalidyl) peroxide containing 100 parts per million of toxicant when spaced over the agar surface give 100 percent control as indicated by clear zones about the areas of the droplets after incubation which gives other areas of abundant growth of the mold.

Mice inoculated via stomach tube with pig ascarid ova one day after being placed on a medicated diet containing 0.03 weight percent of dispersed bis(3-methylphthalidyl) peroxide and maintained on such medicated diet for seven days are found to be free of ascarids in their intestinal tracts and lungs when sacrificed for necropsy. Controls are found to have thriving ascarids in their intestinal tracts and lungs.

What is claimed is:

1. Bis(3-methylphthalidyl) peroxide having the formula

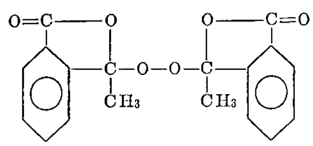

2. Method for making the compound of claim 1 which comprises oxidizing 3-hydroxy-3-methyl-phthalide having the formula 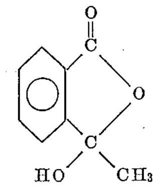 with peroxytrifluoroacetic acid and recovering bis(3-methylphthalidyl) peroxide.

References Cited

UNITED STATES PATENTS 2,938,909 5/1960 Wheeler et al. ------ 260—343.3

ALEX MAZEL, Primary Examiner

A. M. T. TIGHE, Assistant Examiner

U.S. Cl. X.R.

260—502; 424—279